United States Patent [19]

Dunlop et al.

[11] E Patent Number: Re. 33,313

[45] Reissued Date of Patent: Aug. 28, 1990

[54] METHOD FOR MAKING LOW ALPHA COUNT LEAD

[75] Inventors: John A. Dunlop, Veradale, Wash.; Robert W. Smyth; Gerald W. Toop, both of Trail, Canada

[73] Assignee: Cominco Ltd., Vancouver, Canada

[21] Appl. No.: 406,063

[22] Filed: Sep. 12, 1989

Related U.S. Patent Documents

Reissue of:

[64] Patent No.: 4,770,698
Issued: Sep. 13, 1988
Appl. No.: 98,853
Filed: Sep. 21, 1987

[51] Int. Cl.[5] ..... C22B 13/02; C22B 15/00; B03B 5/00

[52] U.S. Cl. ..... 75/432; 75/696; 75/694

[58] Field of Search ..... 75/77, 78, 2; 209/458

[56] References Cited

U.S. PATENT DOCUMENTS

| | | | |
|---|---|---|---|
| 821,330 | 5/1906 | Betts | 75/77 |
| 2,558,724 | 7/1951 | Bailey | 209/458 |
| 2,823,990 | 2/1958 | Barwasser et al. | 75/77 |
| 2,834,669 | 5/1958 | Pendar | 75/77 |
| 2,875,898 | 3/1959 | Spencer | 209/458 |
| 4,164,416 | 8/1979 | Gehri | 75/77 |
| 4,512,950 | 4/1985 | Hosoda et al. | 420/563 |

FOREIGN PATENT DOCUMENTS

| | | | |
|---|---|---|---|
| 0203535 | 11/1954 | Australia | 75/78 |
| 0153913 | 9/1985 | European Pat. Off. | 75/78 |
| 59-169955 | 9/1984 | Japan . | |
| 59-227722 | 12/1984 | Japan . | |
| 62-6793 | 1/1987 | Japan . | |
| 62-146289 | 6/1987 | Japan . | |

OTHER PUBLICATIONS

Kirby, H. W., Chem. Abs. 72563q, vol. 79, 1973, p. 434.
Kirby, H. W., Chem. Abs. 142182r, vol. 79, 1973, p. 358.
Bhattacharyya et al., Chem. Abs. 32437b, vol. 89, 1978, p. 524.
Pounds et al., Chem. Abs. 227630r, vol. 95, 1981, p. 516.
Wai et al., Chem. Abs. 170685b, vol. 96, 1982, p. 550.
Du et al., Chem. Abs. 170891m, vol. 97, 1982, p. 532.
Wai et al., Chem. Abs. 155826f, vol. 100, 1984, p. 472.
Bhattacharyya et al., Chem. Abs. 159682z, vol. 101, 1984, p. 481.
Torma et al., Chem. Abs. 65366t, vol. 102, 1985, p. 201.

*Primary Examiner*—Theodore Morris
*Assistant Examiner*—David W. Schumaker
*Attorney, Agent, or Firm*—Neil F. Markva

[57] ABSTRACT

Lead with a low alpha particle emission is produced by selecting an orebody wherein lead mineral is present in a coarsely disseminated form and substantially free of impurities. The ore is selected from a host rock that is relatively low in alpha emitters, such as a carbonate rock. The ore is mined and is milled such that the lead mineral can be separated from the host rock and any other minerals. The ground ore may be screened into one or more fractions having a narrow range of particle sizes. Each fraction is formed into a fluid suspension, and each suspension is subjected to gravity separation to remove the host rock and any other minerals which substantially contain the alpha particle-emitting substances, and to recover the lead mineral as a concentrate with a low alpha count. The lead concentrate is subjected to a suitable smelting operation, without the introduction of alpha emitters for the recovery of a low alpha lead. When the lead mineral is galena, the smelting is preferably carried out with sodium carbonate and an oxygen-bearing gas in the presence of sodium chloride as a fluxing agent to form a low melting point slag. The low alpha lead has an alpha count of about 0.02 alpha particles per $cm^2$ per hour or less, and the count does not substantially increase with time.

10 Claims, No Drawings

METHOD FOR MAKING LOW ALPHA COUNT LEAD

Matter enclosed in heavy brackets [ ] appears in the original patent but forms no part of this reissue specification; matter printed in italics indicates the additions made by reissue.

BACKGROUND OF THE INVENTION

Lead is often used as a shielding material in radiation evaluation equipment in order to reduce the system background radiation. Lead, however, contains small amount of radioactive isotopes including lead-210, bismuth-210 and polonium-210.

In electronic devices, lead and lead alloys are often used in contacts and solder pads. Integrated circuit memories can suffer from soft errors that can destroy the data in a memory cell and are caused by the alpha particles emitted from the decay daughters of Pb-210, particularly Po-210. Pb-210 has a half-life of 22 years.

Po-210 is well-known as a source of alpha particle emission and it is, therefore, of prime importance to use a lead that has a low alpha particle emission, especially in the above-mentioned applications. The emission is usually measured as a count (alpha count hereinafter) expressed in the number of alpha particles emitted per $cm^2$ per hour. Commercially available lead has alpha counts that may vary from as low as 0.25 to as high as 10 and, unless each batch of lead is analyzed for its alpha count, there is no method for predicting which commercial lead has a low count. There is no commercial process known whereby the Pb-210 can be easily removed from commercial lead. In spite of the fact that Pb-210 has a half-life of 22 years, even lead that is several hundred years old, such as recovered from sunken ships or from church roofs in Europe, has counts of 0.03 to 0.07. These alpha counts are much higher that the level required for electronic devices and integrated circuits. The desired alpha count in the electronics industry is 0.02 or less.

Zone refining, which is a successful method for removing substances that emit alpha particles (alpha emitters hereinafter) from aluminum, does not remove Pb-210 from lead. Although a temporary decrease in alpha count is obtained when lead is zone refined with the initial removal of Bi-210 and Po-210, the count increases again with time to its original level as secular equilibrium is regained, indicating that Pb-210 is not removed.

SUMMARY OF THE INVENTION

The invention is based on the discovery that alpha emitters in lead mineral-containing orebodies are associated with the host rock. Thus, we have found that lead with a low alpha particle emission, i.e. low alpha lead, can be simply produced by carefully selecting the orebody, recovering the lead mineral as a concentrate and reducing the concentrate without the introduction of alpha emitters.

More particularly, we have found that by mining a lead deposit that contains lead mineral in a coarsely-disseminated form substantially free from impurities in a host rock with associated minerals and relatively low in alpha emitters, milling the mined ore and subjecting the ground ore to a gravity separation, the alpha particle-emitting host rock or gangue and associated minerals are effectively removed, and a lead concentrate is obtained that has a low alpha count. Subjecting the concentrate to a suitable smelting operation without the addition of any material that can introduce alpha emitters, yields lead metal that has an alpha count of about 0.02 or less. Suitable smelting operations comprise the reductions of lead minerals with hydrogen, iron, or charcoal, or with sodium carbonate and a sodium chloride flux, provided that these materials have a low alpha count.

Accordingly, there is provided a method for the production of lead with a low emission of alpha particles which comprises the steps of selecting an orebody containing lead mineral in a coarsely-disseminated form substantially free of impurities, and in a host rock together with associated minerals and relatively low in alpha emitters; mining said orebody to produce mined ore; milling said mined ore to form ground ore having particle sizes such that separation of lead mineral from said host rock and associated minerals can be effected; forming a fluid suspension of said ground ore; subjecting said suspension to gravity separation to remove said host rock and associated minerals from said lead mineral; recovering said lead mineral as a concentrate; subjecting said concentrate to a reduction with a reducing agent having no or a low emission of alpha particles to form molten lead; and recovering lead having an alpha count of 0.02 alpha particles per $cm^2$ per hour or less.

In preferred embodiments of the invention, the lead mineral is coarsely disseminated in a carbonate-type host rock; the host rock has an alpha count of less than about one alpha particles per $cm^2$ per hour; the milling of mined ore is conducted such that said ground ore has particle sizes smaller than about 35 mesh; the ground ore is subjected to sizing prior to forming said fluid suspension to form one or more particle size fractions of said ground ore, each fraction having a substantially narrow range of particle sizes; said sizing is carried out to form a particle size fraction having particle sizes in the range of about minus 35 mesh to plus 325 mesh; said sizing is carried out to form three particle size fractions have particle sizes in the ranges of about minus 35 to plus 100 mesh, about minus 100 to plus 200 mesh, and about minus 200 to plus 325 mesh; said reduction is carried out with a reducing agent that does not cause the evolution of noxious gases; and said mineral is galena coarsely-disseminated in a carbonate-type host rock and said reduction is carried out with sodium carbonate with the addition of an oxygen-bearing gas chosed from the group consisting of oxygen, air and oxygen-enriched air, and in the presence of sodium chloride as a fluxing agent for forming a low melting point slag.

It is, therefore, an object of the present invention to provide a method for producing low alpha lead. It is another object to provide an economical method for producing large quantities of low alpha lead on a commercial scale. These and other objects of the invention will become apparent from the following detailed description.

DETAILED DESCRIPTION

Lead occurs mainly as galena but also in the form of carbonate, and sulfate, as well as in other forms. The lead minerals usually occur in combination with other minerals and impurities many of which are alpha emitters. The lead minerals are present in host rocks, many of which are relatively high alpha emitters, i.e., relatively high in uranium and thorium and, consequently, high in the Pb-210 isotope. Other host rocks, especially the carbonate-type host rocks that are usually of a sedimentary type, are relatively low alpha emitters, i.e., relatively low in uranium and thorium, and hence relatively low in Pb-210. Moreover, in many deposits the lead mineral is present in a finely-disseminated form, that is closely associated with impurities. Unless treated in a complex and expensive manner, it is generally not possible to separate the lead mineral from such deposits into a concentrate that can yield low alpha lead.

In order to produce lead with a low alpha count it is, therefore, necessary to select deposits wherein the lead mineral is present in a coarsely-disseminated form substantially free of impurities. Such deposits include the carbonate-type orebodies at Polaris on Little Cornwallis Island and at Pine Point in the Northwest Territories, and at Bixby, Mo. These orebodies all contain galena as the main lead mineral as well as some oxidized lead forms. The galena is present in a coarsely-disseminated form substantially free of impurities in a host rock that has an alpha count of less than about one alpha particles per $cm^2$ per hour.

It is pointed out that low alpha lead can be made directly by reducing pure galena, which can be recovered such as by hand-picking from ore bodies. Such a recovery is, however, not an economically viable method for producing low alpha lead on a commercial scale.

After selecting an orebody with coarsely-disseminated lead mineral substantially free of impurities in a host rock relatively low in alpha emitters, i.e., preferably having an alpha count of less than about one, the ore is mined in the usual well-known manner to produce a mined ore. The mined ore is milled to produce a ground ore. The milling is carried out to a degree sufficient to be able to separate the lead mineral from the host rock and the associated minerals. Depending on the ore, a coarse-milling is usually adequate for effecting a subsequent separation of mineral from rock and the associated minerals. Milling of ore obtained from the above-mentioned orebodies to particle sizes smaller than about 35 mesh (Tyler Standard Screen Scale Sieves Series) is preferable. The milling is carried out using a known method and known equipment.

The ground ore is formed into a fluid suspension suitable for separation of the lead mineral from the host rock and associated minerals by gravity separation. In one embodiment, the ground ore is mixed with water to form an aqueous suspension. The suspension is then subjected to a gravity separation using known equipment such as a spiral, a Wilfley Table or other suitable gravity separation equipment. In a second embodiment, the ground ore is formed into a fluid suspension using air as the medium to form a gaseous suspension and subjected to gravity separation.

A gravity separation is more efficient when the particles in the fluid suspension are substantially of the same size. Preferably, therefore, the ground ore is subjected to a sizing operation, such as by screening or hydro-sizing, prior to forming the fluid suspension, to form a fraciton with a narrow range of particle sizes of the ground ore. Preferably, such a fraction may have particle sizes in the range of about minus 35 to plus 325 mesh. It is understood, however, that other particle size ranges such as, for example, the minus 325 mesh friction, may be used to give the desired results. Preferably, the ground ore is separated into a range of narrow particle size fractions, each fraction being formed into a fluid suspension which is subjected to a gravity separation for the formation of a lead mineral-containing concentrate separated from host rock and associated minerals For example, three particle size fractions may be formed by screening or hydro-sizing, these fractions having particle sizes in the ranges of about minus 35 to plus 100 mesh, about 100 to plus 200 mesh, and about 200 to plus 325 mesh, respectively.

The gravity separation of a fluid suspension of ground ore is effective in separating the host rock that substantially contains the alpha emitters, especially Pb-210, and the associated minerals, from the lead mineral-containing concentrate.

The lead concentrate is subjected to a suitable smelting operation for the recovery of lead metal that has a low alpha count.

Optionally, the concentrate may be subjected to a washing or etching operation prior to smelting. The washing or etching may be carried out to remove residual host rock and associated minerals, and may be effected with organic chemicals or hydrochloric acid substantially free of alpha emitters.

The smelting process must be a simple reduction, because the more complex processes used in large-scale commercial lead smelting operations routinely require the use of additives and fluxes that generally are alpha emitters. The commercially-used smelting processes are, therefore, not suitable for reducing the lead concentrate, not even pure galena, to a low alpha lead.

Suitable smelting processes comprise reductions of the lead concentrate with, for example, hydrogen, iron, or charcoal. These reductions are well-known. The reducing agent must be a material that has no or a low alpha count. When smelting a lead concentrate, it is also desirable to avoid the evolution of noxious gases, such as hydrogen sulfide and sulfer dioxide. The preferred smelting process using a low alpha count reducing agent and without the evolution of noxious gases is the process of smelting lead sulfide (galena) concentrate with sodium carbonate and the addition of an oxygen-bearing gas. In order to form a low melting point slag, sodium chloride is added as a fluxing agent. The sodium chloride and the sodium sulfate formed during smelting form a low melting point slag at about 600° C. Both sodium carbonate and sodium chloride have no or a low alpha count. The oxygen-bearing gas is chosen from the group consisting of oxygen, air and oxygen-enriched air. The smelting reaction takes place according to the following equation:

$$2PbS + 2Na_2CO_3 + 3O_2 + 2NaCl \rightarrow 2Pb + 2(NaCl \cdot Na_2SO_4) + 2CO_2$$

Preferably, the lead sulfide concentrate is mixed with an excess of sodium carbonate and sodium chloride, and is smelted in a suitable vessel with the lancing of oxygen-bearing gas. The molten lead is easily separated from the molten slag and lead metal is recovered as low alpha lead with an alpha count of about 0.02 or less. It is noted that the alpha count of lead produced according to the process of the invention remains substantially constant with time.

The invention will now be illustrated by means of the following non-limitative examples.

EXAMPLE 1

This example illustrates the method of the invention.

Coarsely-disseminated lead mineral substantially free of impurities was selected from the carbonate-type galena ore body at Pine Point, N.W.T. The ore body was mined and the ore was coarse-crushed to smaller than one inch, fine-crushed to smaller than ⅜ inch using jaw crushers, ground in a pulverizer, and screened to minus 35 mesh. The alpha count of a sample of screened ore was 0.24. The screened ore was made into a fluid suspension by the addition of water and subjected to a gravity separation using a Deister table model RH15SSD. Two hundred and twenty eight kg of lead concentrate containing 84% lead was separated. The alpha count of a sample of the concentrate was 0.02 alpha particles per $cm^2$ per hour. This concentrate was again subjected to gravity separation yielding a second concentrate containing 86% lead with an alpha count of less than 0.01. A portion of the lead concentrate was mixed with stoichiometric excesses of sodium carbonate and sodium chloride having an alpha count of 0.03. The mixture was smelted with air sparging in a graphite crucible (low alpha count) for six hours at a temperature in the range of 800° to 1000° C. Eighty two kg of lead metal, which separated readily from the slag, was recovered. The grade of the lead metal was 99.99%. The alpha count of the recovered metal was less than 0.01. Upon monitoring the count over a period of time, it was determined that the alpha count remained essentially constant.

The results show that low alpha lead can be produced from lead mineral that is coarsely-disseminated in a host rock substantially free of impurities and relatively low in alpha emitters by subjecting crushed ore in a fluid suspension to a gravity separation and smelting the resulting concentrate with a reducing agent with no or a low alpha count. The results also show that alpha emitters are associated with the host rock.

EXAMPLE 2

Galena ore was hand-picked from the Polaris, Pine Point and Bixby ore bodies. The galena was coarsely-disseminated in a carbonate-type host rock and was substantially pure.

The hand-picked galena, which was substantially free of host rock and impurities, each had alpha counts of less than 0.01. Nine hundred grams of hand-picked galena from each ore body was mixed with 600 g of sodium carbonate and 300 g of sodium chloride and smelted in a graphite crucible for two hours at 950° C. Lead metal was recovered from each smelting with an 80% recovery, and was determined to have an alpha count of less than 0.01 in each case. The alpha counts of the lead recovered from each smelting did not increase with time.

The results show that pure galena has a low alpha count and that the alpha count does not increase when the galena is smelted according to the method of the invention.

EXAMPLE 3

This example illustrates that low alpha lead can not be produced by conventional, commercially-used processes, even when the lead mineral is present in a coarsely-disseminated form in a low alpha count host rock.

A lead concentrate was produced by crushing, grinding and froth flotation of ore obtained from the Pine Point mine. The alpha count of the lead concentrate was 0.428. This concentrate was subjected to conventional, commercial smelting with the addition of limerock, silica and coke. A sample of lead metal recovered from this smelting had an alpha count of 0.06. The alpha count increased, however, with time to a value of 0.17 after twelve months.

Nine hundred grams of the same lead concentrate with an alpha count of 0.428 was smelted as in Example 2. The lead recovered from this smelting had an alpha count of 0.05. The count was also found to increase with time.

The results show that the usual commercial processes used for concentrating lead mineral do not yield a lead concentrate that has even a relatively low alpha count. Furthermore, that neither commercial-type smelting nor smelting with agents that have no or a low alpha count of a froth flotation concentrate yield low alpha lead with an alpha count that remains constant with time.

It is understood that modifications may be made in the process of the invention without departing from the scope of the appended claims.

We claim:

1. A method for the production of lead with a low emission of alpha particles which comprises the steps of selecting an orebody containing lead mineral in a coarsely-disseminated form substantially free of impurities, and in a host rock together with associated minerals and relatively low in alpha emitters; mining said ore body to produce a mined ore; milling said mined ore to form ground ore having particle sizes such that separation of lead mineral from said host rock and associated minerals can be effected; forming a fluid suspension of said ground ore; subjecting said suspension to a gravity separation to remove said host rock and associated minerals from said lead mineral; recovering said lead mineral as a lead concentrate; subjecting said concentrate to a reduction [with a reducing agent having no or a low emission of alpha particles to form molten lead;] *without the introduction of alpha emitters;* and recovering lead having an alpha count of 0.02 particles per $cm^2$ per hour or less from said reduction.

2. A method as claimed in claim 1, wherein said lead mineral is coarsely disseminated in a carbonate-type host rock.

3. A method as claimed in claim 1, wherein said host rock has an alpha count of less than about one alpha particle per $cm^2$ per hour.

4. A method as claimed in claim 1, wherein said milling of ground ore is conducted such that said ground ore has particle sizes smaller than about 35 mesh.

5. A method according to claim 1, wherein said ground ore is subjected to sizing prior to said forming of a fluid suspension to form one or more particle size fractions of said ground ore, each fraction having a substantially narrow range of particle sizes.

6. A method as claimed in claim 1, wherein said ground ore is subjected to a sizing to form a particle size fraction having particle sizes in the range of about minus 35 mesh to plus 325 mesh.

7. A method as claimed in claim 5, wherein said ground ore is subjected to sizing by screening or hydrosizing to form three particle size fractions, the first fraction having particle sizes in the range of about minus 35 to plus 100 mesh, the second fraction having particle sizes in the range of about minus 100 to plus 200 mesh, and the third fraction having particle sizes in the range of about minus 200 to plus 325 mesh.

8. A method as claimed in claim 1, wherein said reduction of lead concentrate is carried out with a reducing agent that does not cause the evolution of noxious gases.

9. A method as claimed in claim 1, wherein said lead mineral is galena coarsely-disseminated in a carbonate-type host rock and said reduction is carried out with sodium carbonate and the addition of an oxygen-bearing gas chosen from the group consisting of oxygen, air and oxygen-enriched air, and in the presence of sodium chloride as fluxing agent for forming a low melting point slag.

*10. A method as claimed in claim 1, wherein said reduction of lead concentrate is carried out with a reducing agent having no or a low emission of alpha particles.*

* * * * *